(12) United States Patent
Leonard et al.

(10) Patent No.: US 7,914,872 B2
(45) Date of Patent: Mar. 29, 2011

(54) SEGMENTED INSULATIVE DEVICE AND RELATED KIT

(75) Inventors: Kathie Leonard, Auburn, ME (US);
Ernest Mattox, Auburn, ME (US);
Gordon Hart, Shrewsbury, MA (US)

(73) Assignee: Auburn Manufacturing, Inc., Mechanic Falls, ME (US)

( * ) Notice: Subject to any disclaimer, the term of this patent is extended or adjusted under 35 U.S.C. 154(b) by 108 days.

(21) Appl. No.: 12/508,562

(22) Filed: Jul. 23, 2009

(65) Prior Publication Data

US 2011/0020579 A1     Jan. 27, 2011

(51) Int. Cl.
*B32B 3/06* (2006.01)
(52) U.S. Cl. .............................. 428/76; 428/99; 428/102
(58) Field of Classification Search .................. 428/76, 428/99, 102
See application file for complete search history.

(56) References Cited

U.S. PATENT DOCUMENTS

| | | |
|---|---|---|
| 4,112,967 A | 9/1978 | Withem |
| 4,207,918 A | 6/1980 | Burns et al. |
| 4,295,669 A | 10/1981 | Laprade et al. |
| 4,556,082 A | 12/1985 | Riley et al. |
| D293,703 S | 1/1988 | Kaye |
| 4,925,605 A | 5/1990 | Petronko |
| 5,025,836 A | 6/1991 | Botsolas |
| 5,027,862 A | 7/1991 | Laybourn |
| RE34,832 E | 1/1995 | Lechuga |
| 5,505,500 A | 4/1996 | Webb et al. |
| 5,713,394 A | 2/1998 | Nygaard |
| 5,941,287 A | 8/1999 | Terito, Jr. et al. |
| 6,000,420 A | 12/1999 | Nicholson et al. |
| 6,358,591 B1 | 3/2002 | Smith |
| 6,530,603 B1 | 3/2003 | Hartman |
| 6,634,390 B2 | 10/2003 | Toth |
| 6,907,907 B2 | 6/2005 | Maida |
| 6,997,483 B2 | 2/2006 | Perlatti |
| 7,159,620 B2 | 1/2007 | Kissell |
| 7,607,457 B2 | 10/2009 | Tigerfeldt |
| 2007/0017590 A1 | 1/2007 | Tigerfeldt |

OTHER PUBLICATIONS

Johns-Manville Zeston PVC Insulated Fitting Covers Installation Guide (2008).
Iso Covers Ltd, http://www.isocovers.com/usa/pdfs/high-temperature-shoulder-blanket.pdf, Lewisville, Texas, USA, dated Oct. 2007, 2 pages.
Thermaxx, LLC, http://www.thermaxxjackets.com/page/products/, West Haven, Connecticut, USA, screenshot dated Dec. 28, 2010, 2 pages.
Hitco Carbon Composites, Inc., Sewn Insulation Blanket, Jul. 20, 2009 12:11 pm http://www.hitco.com/HITCO%20Materials-Sewn%20Blanket.htm.
Orcon Aerospace, http://www.orcon-aerospace.com/airframe_insulation.htm, Union City, California, USA, screenshot copyrighted 2010, 1 page.
Inproheat Industries Ltd., http://inproheat.com/sites/files/documents/Kao-Tex_%20Quilt.pdf, Vancouver, British Columbia, Canada, Nov. 1999, Product Information Sheet for Kao-Tex Quilt from ThermalCeramics, 2 pages.

*Primary Examiner* — Alexander Thomas
(74) *Attorney, Agent, or Firm* — Dennis R. Haszko

(57) ABSTRACT

A segmented insulative device and related kit for insulating components of a thermal distribution system. The kit includes a sheet of segmented insulation formed by a composite layer of segmented, flexible, pre-sewn insulation that is easily cut to size in the field using scissors, utility knives or other simple, hand-held cutting devices. The kit also includes two-sided hook-and-loop straps as fasteners, also easily cut to length, using hand-held devices. The segmented insulation and the hook-and-loop straps are attached to one another in the field using a stapler or other hand-held attachment device. This provides an installation kit that an installer can use to provide a versatile insulation in the form of the assembled segmented insulative device. The segmented insulative device lends itself to quick customization on-site rather than requiring costly off-site manufacture or pre-assembly and subsequent quick installation on the pipe component requiring thermal installation.

12 Claims, 7 Drawing Sheets

SEGMENTED INSULATIVE DEVICE AND RELATED KIT

FIELD OF THE INVENTION

The present invention relates generally to thermal insulation. More particularly, the present invention relates to insulative padding and related insulation kit for reducing thermal transfer from pipe couplings, valves, and other exposed conduit areas.

BACKGROUND OF THE INVENTION

In the field of thermal insulation, numerous attempts have been made to insulate conduits to alleviate heat transfer and thereby reduce related energy costs. Such heat transfer may be due to heat loss from heat bearing systems (e.g., steam distribution pipes) or heat gain to cold materials (e.g., chilled water distribution pipes). This is most common within industrial, institutional, and/or commercial settings that include thermal energy distribution systems. Straight sections of pipes within the distribution system are typically completely encased, often permanently, within a continuous insulation material suitably chosen for high heat tolerance. However, such systems often include a variety of pipe components and equipment including, but not limited to, flanges, valves, valve stems, and steam traps. These components often require some level of maintenance. In turn, this requires some level of physical access to the particular component necessitating removal of the thermal insulation materials.

Removable/reusable insulation blankets, in the form of clamshells, have been used to insulate such components requiring periodic and/or frequent access. However, most clamshell type of removable/reusable component insulation devices are designed to be installed by skilled insulation installers and are generally difficult to re-attach by personnel unskilled in pipe insulation due in large part to wire lacing which is normally cut and discarded during removal. Accordingly, once a maintenance issue occurs at the component site, it is common within industrial, institutional, and/or commercial settings to see an insulation device lying unused nearby. Several such flawed attempts have been identified among previous related devices.

One previous attempt at providing pipe insulation is found in U.S. Pat. No. 4,112,967 issued to Withem on Sep. 12, 1978 for a weatherproof insulated valve cover. The Withem valve cover is for a pipeline and provided a flexible multi-layered construction shaped to conform to valves having stub pipe-type valve stem housings. The valve cover included a waterproof outer layer of Herculite or the like with one of the inner layers being insulation. The cover was easily removable by virtue of releasable fasteners to permit access to the valve for maintenance.

Another previous attempt is found in U.S. Pat. No. 4,207,918 issued to Burns et al. on Jun. 17, 1980 for an insulation jacket. The Burns et al. device is an insulation jacket for use as a valve cover. The jacket includes a body portion having a central section and two lateral sections. Each of the lateral sections includes an inboard and outboard belt and each of the belts extends along each of the lateral sections. The ends of each of the belts are adapted to interlock whereby the insulation jacket may be securely fastened around a valve casting.

Yet another attempt is found in U.S. Pat. No. 4,556,082 issued to Riley et al. on Dec. 3, 1985 for a removable thermal insulation jacket for valves and fittings. The Riley et al. device is a unitary flexible thermal insulation jacket for valves and pipe fittings. The jacket is universal in the sense that it properly fits valves and pipe fittings of various manufacturers. It is secured snugly to a valve or pipe fitting by attached draw cords, rendering the jacket readily removable and reusable.

Still another attempt is found in U.S. Pat. No. 4,925,605 issued to Petronko on May 15, 1990 for a method of forming a heat foam insulation jacket. Petronko discloses a unitary removable and reusable jacket for the thermal insulation of pipe components. The fully-formed generally-rectangular jacket is composed of three layers: a heat and water resistant outer fabric layer, a hardened rigid-cell polyurethane middle layer, and a thin flexible heat-shrinkable plastic inner layer. The inner and outer layers are joined together by perimeter seams and a transverse center seam which forms two pockets adapted to contain the polyurethane foam middle layer. The inner and outer layers are formed at time of manufacture while the middle layer is formed during the application process. During the application process, an exothermic chemical reaction is generated by the combination of the chemicals polyol and isocyanate which are inserted between the inner and outer layers through holes contained in the outer layer, to form a rapidly expanding and hardening rigid cell polyurethane foam middle layer. During the application of the jacket around the accouterment, in response to the exothermic chemical reaction, the inner layer shrinks to fit the exact shape of the underlying pipe, as does the rigid-cell middle layer which is being formed. When installation is complete, the jacket may be removed and reused by using pressure to "crack" the transverse seam dividing the middle layer into two pockets which are positioned on opposite sides of the accouterment.

Yet still another attempt is found in U.S. Pat. No. 5,025,836 issued to Botsolas on Jun. 25, 1991 for a pipe fitting cover for covering pipe fitting. The Botsolas device discloses a rigid or semi-rigid cover for installation over an insulated pipe fitting. The cover is pre-cut in the geometric design that enables it to conform to the shape of the pipe fitting when installed.

Still another attempt is found in U.S. Pat. No. 5,713,394 issued to Nygaard on Feb. 3, 1998 for a reusable insulation jacket for tubing. The Nygaard device is a reusable single layer insulation jacket for splicing and termination of industrial tubing, fittings, and valves carrying extreme hot and cold materials comprises a fiberglass mat. The mat is of a width as to completely wrap the tubing, fitting, or valve and overlap itself. Releasable fastening means securely hold the mat in place to insulate the tubing, fitting, or valve from fire and to prevent an individual from otherwise being burned from contacting the tubing, fitting, or valve.

Further still another attempt is found in U.S. Pat. No. 5,941,287 issued to Terito, Jr. et al. on Aug. 24, 1999 for a removable reusable pipe insulation section. The Terito, Jr. et al. device discloses a removable reusable insulating unit suitable for insulating exposed pipe sections forming components of an insulated pipe system. The unit includes a hollow body constructed of an insulating material which is capable of being easily cut the hollow body defining an interior and an exterior of the insulating unit. The interior is sized to envelop an exposed pipe section on an insulated pipe system. The body has at least two pipe receptor areas and each is sized to accommodate a component of an insulated pipe system.

The competing requirements of maintaining an enclosed insulation layer yet enabling physical access for component maintenance has led to a variety of removable insulation devices to reduce thermal losses. The common aspect of such existing removable insulation devices is that they are designed with a particular component in mind and shaped accordingly. That is to say, a typical removable insulative device for example designed for a valve is shaped in such a way that the device is rendered unsuitable for a flanged coupling or a steam trap. This tends to drive up costs to the end user. Oftentimes, an industrial, institutional, and/or commercial user will be required to purchase several different shapes and sizes for the variety of components found within their system. This can be an unwieldy and costly solution.

It is, therefore, desirable to provide an insulation device that is versatile, cost-effective, and reusable.

SUMMARY OF THE INVENTION

It is an object of the present invention to obviate or mitigate at least one disadvantage of previous insulation devices.

The present invention provides a versatile insulation in the form of a segmented insulative device. Moreover, the segmented insulative device lends itself to quick customization on-site, rather than requiring costly off-site manufacture or pre-assembly and subsequent quick installation on the pipe component requiring thermal insulation. The segmented insulative device is designed for versatility provided by the device's embodiment within an installer's kit. The kit to fabricate the segmented insulative device includes a large sheet of segmented insulation, a roll of reusable fastening tape (e.g., two-sided hook-and-loop type such as Velcro® straps), a cutting mechanism (e.g., scissors or retractable razor cutter) for cutting suitably-sized portions of both the segmented insulation sheet and the reusable fastening tape, and a fastener (e.g., stapler or similar fastening means) to connect a section of the reusable fastening tape to the custom-cut section of segmented insulation. A stapler can be used to attach the hook-and-loop tape to the insulative device to facilitate installation and so the two do not become later separated.

In a first aspect, the present invention provides a segmented insulative device including: a first layer and a second layer each formed from a flexible material, the flexible material being resistant to moisture and heat; an inner layer of flexible insulation held between the first and second layers by way of stitching, the stitching forming a cut-site for separating the segmented insulative device into multiple sections; and one or more fastening mechanisms for securing one or more of the multiple sections to a component of a thermal distribution system.

In a further embodiment, there is provided a kit for on-site fabrication of a segmented insulative device, the kit including: a sheet of segmented insulation capable of separation into multiple sections; a reusable fastening tape capable of removably securing one or more of the multiple sections upon a component of a thermal distribution system; a cutting mechanism capable of separating the sheet of segmented insulation into the multiple sections and resizing the reusable fastening tape; and a fastener such as a stapler capable of readily affixing the reusable fastening tape to a corresponding one of the multiple sections at the site.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

Embodiments of the present invention will now be described, by way of example only, with reference to the attached Figures.

DETAILED DESCRIPTION

Generally, the present invention provides a segmented insulative device and related kit for insulating certain serviceable components of a thermal energy distribution system. Although the invention will be described in terms of insulation in high temperature settings, it should be understood that the present invention is equally useful and suitable for insulating against heat loss from heat bearing systems (e.g., steam distribution pipes) or heat gain to cooling systems (e.g., chilled water distribution pipes). The present invention provides a versatile, reusable, and cost-effective insulative device useful for a variety of pipe serviceable components and equipment including, but not limited to, flanges, valves, valve stems, and steam traps. During typical maintenance of such components, the present invention ensures easy physical access to the particular component.

Figure 1:
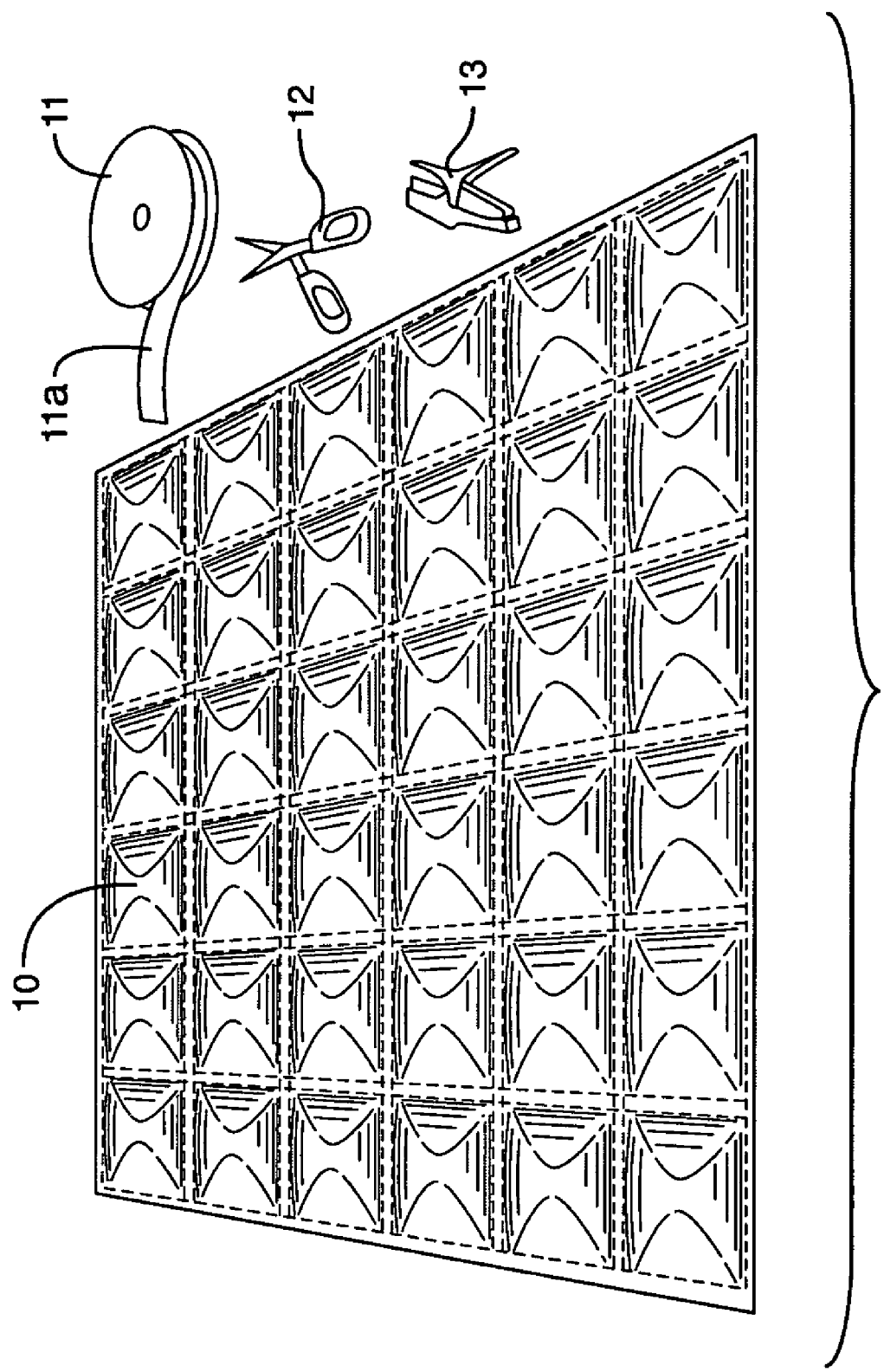
FIG. 1 is an illustration showing one embodiment of the kit components in accordance with the present invention.

With reference to FIG. 1, there are illustrated the kit elements 10, 11, 11a, 12, and 13 in accordance with the segmented insulative device. The kit shown is used by an installer to fabricate the segmented insulative device on site and typically within an industrial, institutional, and/or commercial setting. The inventive kit includes a standard sized sheet of segmented insulation 10, a supply (e.g., roll 11) of reusable fastening tape 11a, a cutting mechanism 12, and a fastening device 13. More specifically, the supply of reusable fastening tape is a roll 11 of suitably dimensioned (e.g., 1" to 2" wide and 10' to 20' long) two-sided hook-and-loop type fastening tape 11a such as, but not limited to, Velcro® straps with the hooks on one side and the loops on the other. By use of the term "reusable," it should be understood that the tape 11a is self-sealing or self-adhering in such a manner that it can be fastened, unfastened, and refastened many times over.

The cutting mechanism 13 may be a pair of scissors, retractable razor cutter, utility knife, or any similarly durable cutting device suitable for cutting both the supply of fastening tape 11a and the sheet of segmented insulation 10. The fastening device 13 can be a stapler, rivet gun, or any similarly durable fastening device suitable for connecting a section of the reusable fastening tape 11a to a custom-cut section of segmented insulation 10. For illustrative clarity, a specific stapler 13, pair of scissors 12, and roll of hook-and-loop tape 11a are shown in FIG. 1 though any suitable substitutions may be made for these particular kit elements without straying from the intended scope of the present invention.

Figure 2A:
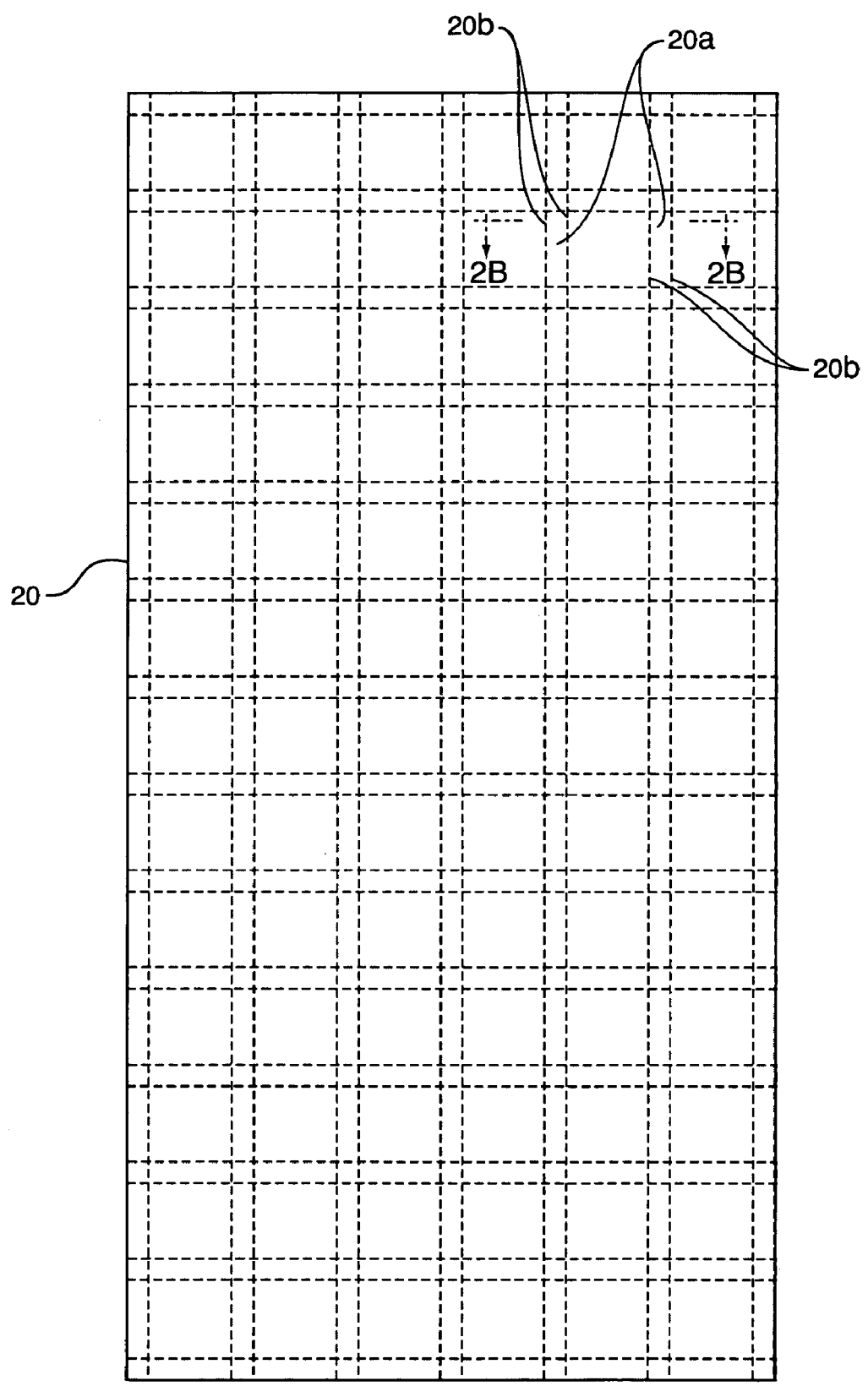
FIG. 2A illustrates a standard sized sheet of segmented insulation and detailing sewing patterns in accordance with the present invention.
Figure 2B:
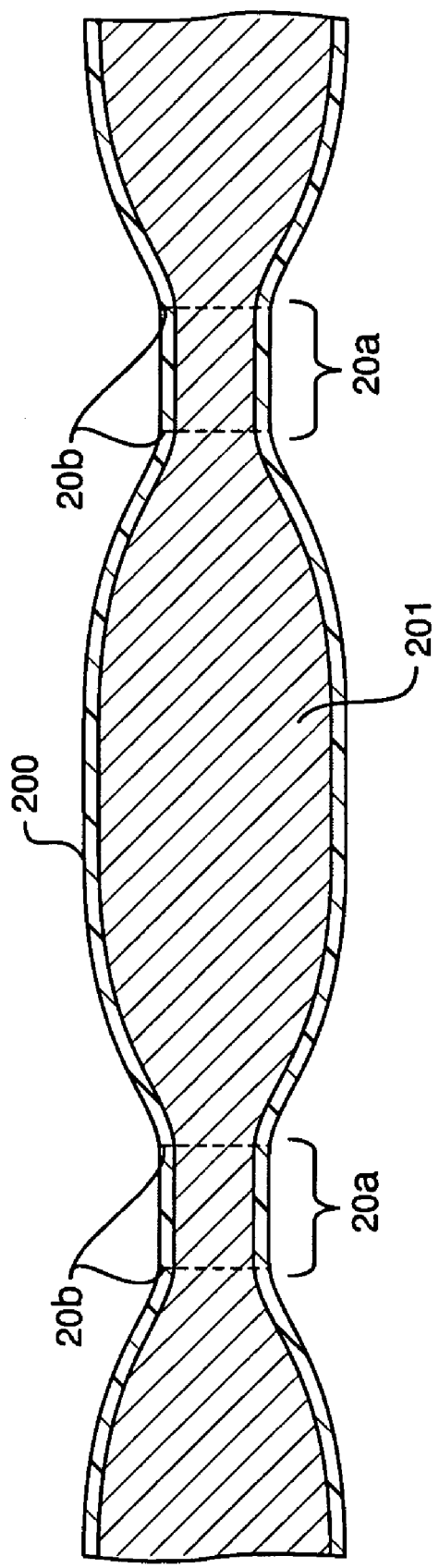
FIG. 2B is a cross-section taken across line 2B-2B in FIG. 2A showing composite layering.

With regard to FIGS. 2A and 2B, detailed illustrations of the segmented insulation are shown. FIG. 2A is a top view of a standard sized sheet 20 of the segmented insulation. The sheet 20 of segmented insulation resembles in some regard a quilted blanket in that uniform squares or rectangles are formed in a grid pattern across the sheet surface. Although a particular sized sheet is shown having six grids in width and twelve grids in length, it should be readily understood that any particular width and length may be produced without straying from the intended scope of the present invention.

Typically, the whole sheet 20 would be provided within the kit in a rolled up fashion. Limiting factors in terms of whole sheet dimensions may include the length and weight of any given rolled sheet of segmented insulation. Indeed, smaller rolls may be less difficult for an installer to carry through cramped quarters among thermal piping, though larger rolls may afford the installer more sizing variations. Accordingly, ease of use and portability are factors in determining a standard size for the rolled sheet of segmented insulation and such standard may vary according to any given industrial, institutional, and/or commercial application. FIG. 2A is therefore only one example of a standard size such that the sheet may alternatively be 4'×8, 2'×8' or any desired dimension. When considering the whole sheet and the given weight constraints for any particular application, it should also be understood that, for example, a 2'×16' sheet would weigh the same as 4'×8'. Therefore, it should be readily apparent that the whole sheet of segmented insulation may be provided in a variety of standard sizes.

With regard to FIG. 2B, a partial cross section is illustrated from the view taken along line 2B-2B in FIG. 2A. The composite layering of the segmented insulation is visible here such that a middle layer 201 of insulation is sandwiched between two outer layers 200 of material that may be selected from heat resistant or heat and moisture resistant material. In practice, the two outer layers 200 would be formed from heat resistant material and either one or both layers may be coated with a moisture resistant coating depending upon the given implementation—e.g., a steam pipe implementation within a damp environment may require would both layers 200 to be moisture and heat resistant whereas a steam pipe implementation within a generally dry environment may only require the layer adjacent the steam pipe to include moisture resistance. Thus heat and moisture resistance may vary in regard to the given layer (i.e., "inner" or "outer" exposure) and related implementation without straying from the intended scope of the present invention.

The insulation may be any suitable insulative material including, but not limited to, fiberglass, aramid, silica, aerogel, or any other flexible insulation material. In the instance of fiberglass, suitable fiberglass insulation for the middle layer 201 can include a fiberglass density of between 1 and 2 pounds per cubic foot and may be needled or bonded so as to maximize its insulation value. The outer layers 200 of moisture and heat resistant material may be fabricated from any flexible material suitable for continuous exposure to temperatures up to and exceeding 500 degrees Fahrenheit. The outer layers 200 can include a base fabric capable of continuous use at 500 degrees Fahrenheit having uncoated weights ranging between six and sixty ounces per square yard. Such base fabric may be, but not limited to, fiberglass material. As well, such base fabric may be coated with suitable heat resistant materials that may include, but are not limited to, high temperature coatings of heat resistant rubbers or silicone compounds.

With further regard to FIG. 2B, there are areas visible that are of reduced thickness 20a. Such thinner areas 20a are formed by the parallel rows of sewing thread 20b. This creates the aforementioned "quilted" characteristic, and more importantly creates a cut-line guide for the installer. Such cut-line is the center point between the two parallel rows of sewing thread 20b. In another embodiment, a third sewn line may be provided at the center point between the two parallel rows of sewing thread 20b such that three rows of stitching are actually provided. In this manner, the cut-line would be the center stitching line. Preferably, an installer would cut along such center point in the field. However, the sewing thread 20b will remain intact and prevent loss of the flexible insulation 201 from between the two outer layers 200 so long as the installer cuts between the parallel rows of sewing thread 20b. That is to say, minor deviation from a cut along the center point is tolerable without straying from the intended scope of the present invention. This allows for imperfect field cutting technique during installation without any impact on the installed segmented insulative device.

It should be understood that the sewing thread used should be formed from moisture and heat resistant material suitable for continuous exposure to temperatures up to and exceeding 500 degrees Fahrenheit. Such suitable materials may include, but are not limited to, high temperature filaments. Possible filament materials include, but are not limited to, aromatic polyamides and fiberglass that may be treated with a polytetrafluoroethylene coating or any other suitable sewing thread that will withstand the temperatures of the given implementation.

Although FIG. 2B shows only one layer of fiberglass 201 sandwiched between two outer layers 200, it should be understood that any suitable composite of additional layers may be possible and preferable for different working environments— e.g., extreme humidity conditions. As well, multiple sections of segmented insulation can be used such that they are installed upon one another to create an increased insulative effect. In such instance, the multiple sections of segmented insulation can be overlapped in such a manner that staggers the thinner areas 20a compressed by the sewing thread 20b.

As mentioned above, the sheet of segmented insulation 20 can be formed in any standard size suitable for the given application. Likewise, the sewing threads 20b may be spaced such that the non-compressed areas in FIG. 2B are generally square or generally rectangular and formed in any suitable size—e.g., 4"×4", 4"×6", 8"×8", . . . etc. However, for most versatility it is preferable that the non-compressed areas are a square dimension of between 4" and 9". The segmented pattern effectively means that the segmented insulation 20 can be cut along the small separation 20a between sewing threads 20b so that there is minimal exposure of the inner insulation 201 and still provide a snug fit upon installation. The small section 20a between the sewing threads 20b is variable upon initial manufacture. However, a range of between 0.5" to 1" is preferable because larger values will leave more insulation 201 exposed and would waste materials, whereas smaller values would make fabrication more difficult.

The inventive aspects of the segmented insulative device formed by the kit elements 10, 11, 11a, 12, and 13 described with regard to FIGS. 1, 2A, and 2B include the ease by which the segmented insulative device is installed, uninstalled, and reinstalled. This contributes to the invention's significant reusability and related cost-effectiveness. Installation using the kit elements 10, 11, 11a, 12, and 13 will now be described with regard to FIGS. 3A through 3E in terms of preliminary sizing and FIGS. 4A through 4E in terms of actual installation technique. It should be understood that these installation figures represent but one installation example and relate to a custom installation for an in-line valve 400, 401 of a generally "T" shaped configuration. Many other configurations and custom installations are possible and will become readily apparent to one of skill in the art upon consideration of the installation details herein below.

Figure 3A:
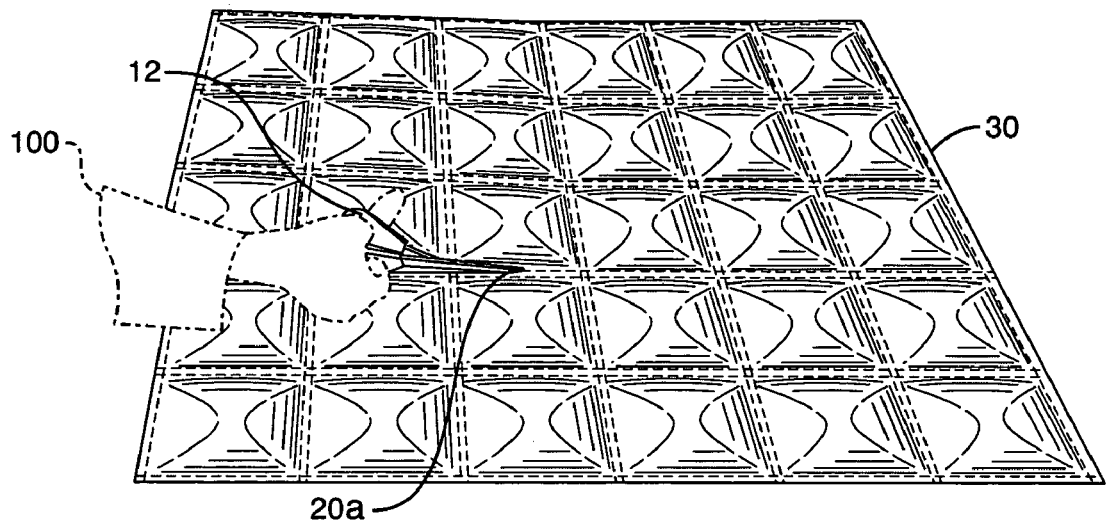
FIG. 3A is an illustration showing the segmented insulation sheet cutting step using the kit elements as shown in FIG. 1.
Figure 3B:
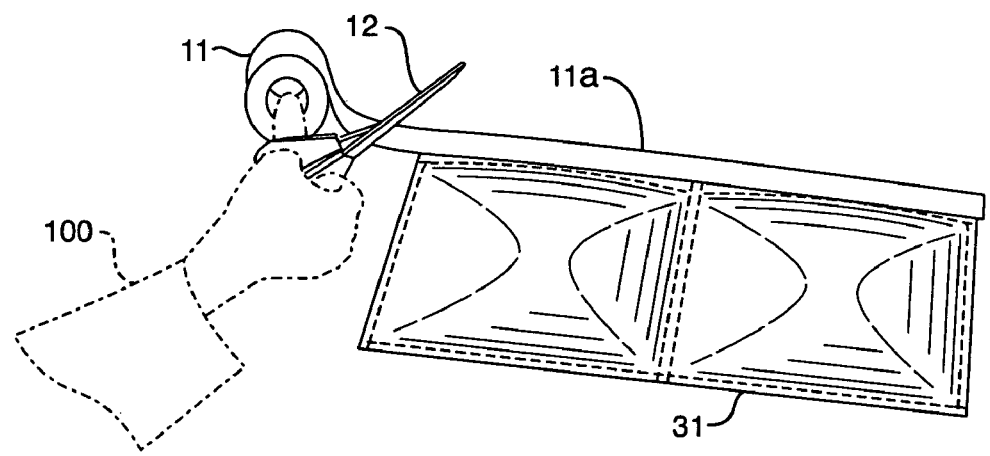
FIG. 3B is an illustration showing the fastening tape cutting step using the kit elements as shown in FIG. 1.

Preliminary to any installation, an installer 100 will measure the portions of the pipe and/or pipe component (e.g., valve 400, 401) desired to be covered by the segmented insulative device. Once measured, the installer 100 will translate such measurements to the portion(s) of the whole sheet of segmented insulation. With regard to FIG. 3A, the installer 100 then uses the scissors 12 and proceeds with cutting the required portion(s) of the whole sheet 30 of segmented insulation. Once the required portion(s) 31 are cut, the installer 100 will then obtain a suitable length of hook-and-loop tape 11a as shown in FIG. 3B from the roll 11 provided in the kit.

Figure 3C:
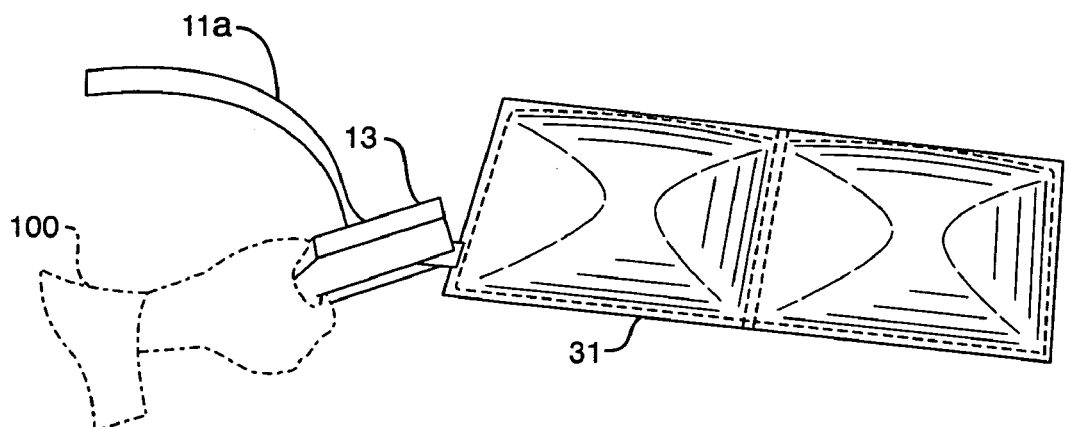
FIG. 3C is an illustration showing the fastening tape connection step using the kit elements as shown in FIG. 1.
Figure 3D:
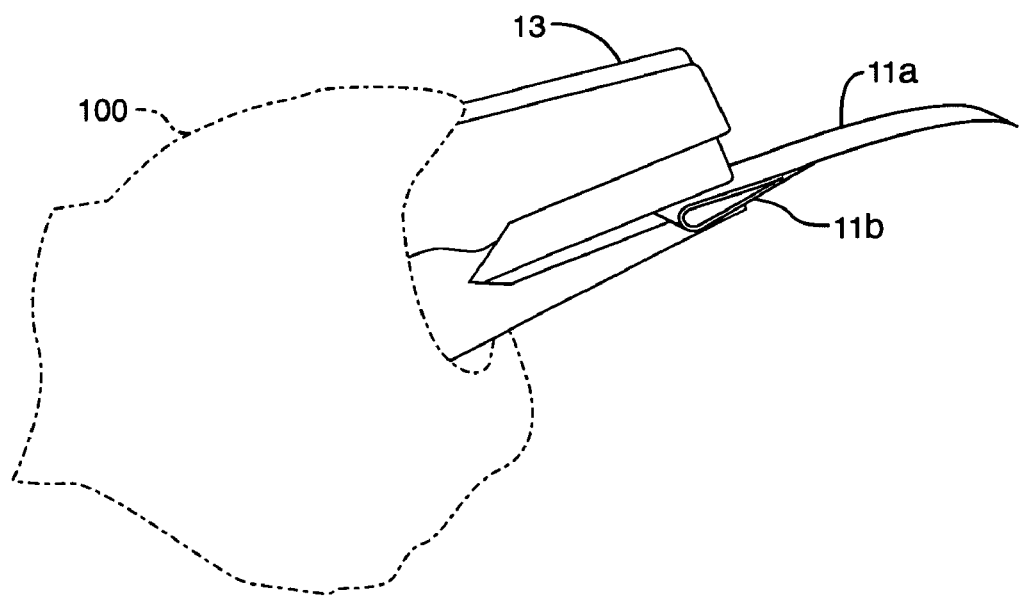
FIG. 3D is an illustration showing the fastening tape tab-creation step using the kit elements as shown in FIG. 1.

The cut length of hook-and-loop tape 11a is then fastened to the required portion(s) 31 of segmented insulation by the installer as shown in FIG. 3C. Fastening of the hook-and-loop tape 11a can be accomplished staples via stapler 13. Such staples are preferably capable of use in high humidity/steam environment. To reduce tangling and also to provide a firmer hold for the installer 100, the loose end of the hook-and-loop tape may be doubled back and stapled to itself as shown in FIG. 3D as element 11b. The resulting assortment of assembled and custom-sized sections 31, 32, 33 of the segmented insulative device are shown in FIG. 3E prior to installation.

Figure 3E:
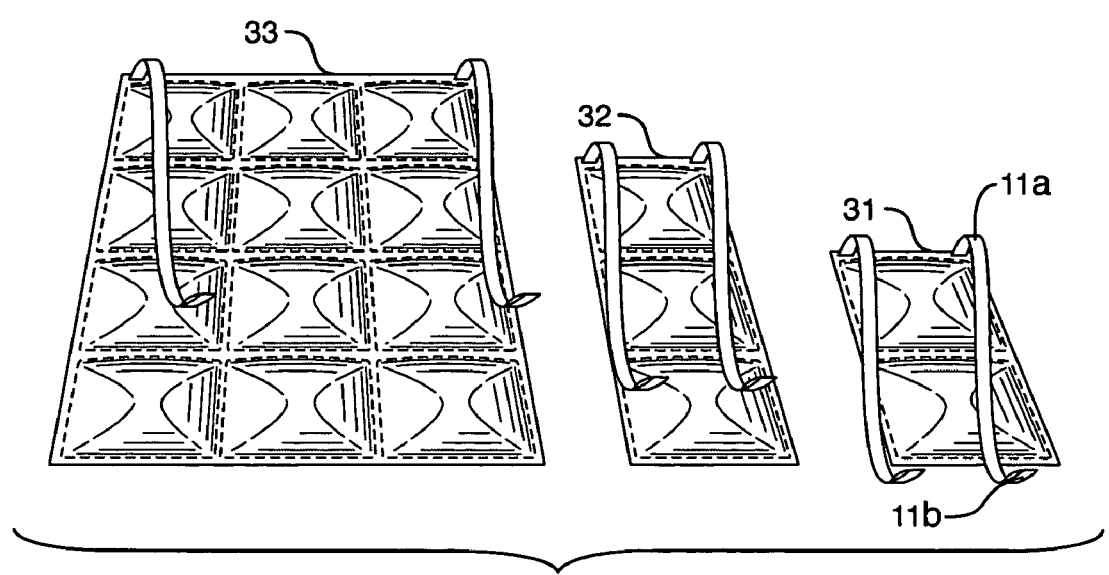
FIG. 3E is an illustration showing three custom assemblies of differently-sized segmented insulative devices in accordance with the present invention.
Figure 4A:
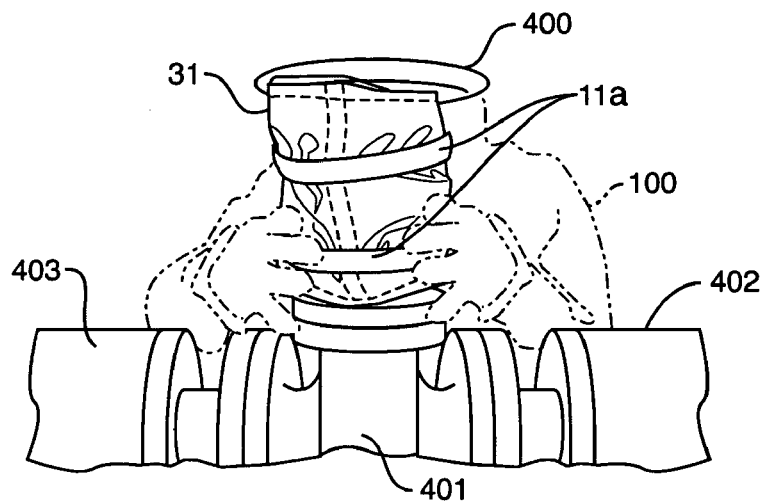
FIGS. 4A through 4E illustrate the step-by-step, on-site installation of the three differently-sized assemblies shown in FIG. 3F as applied to a valve component.
Figure 4B:
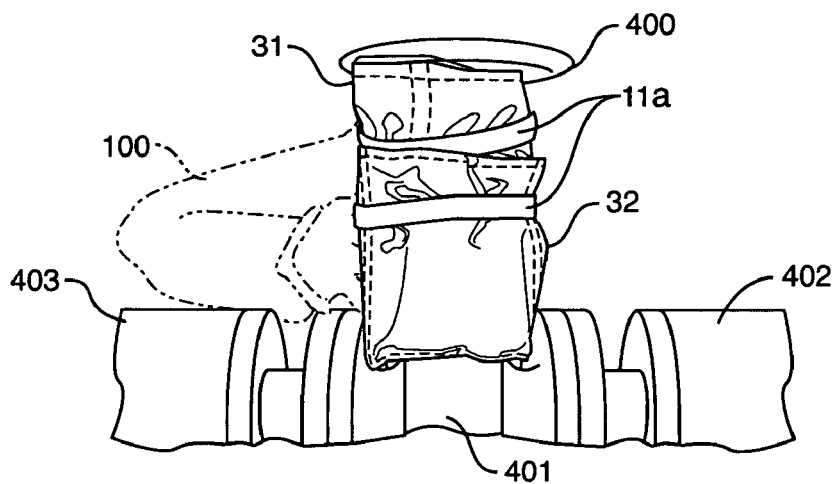

With regard to FIG. 4A, the smallest section 31 of FIG. 3E is shown wrapped and strapped to the uppermost area 400 of the valve. The hook-and-loop tape 11a may be strapped either tightly or loosely around the section of segmented insulative device depending on whether the installer intends for the valve to be usable without removal of the segmented insulative device. In FIG. 4B, the installer is shown to wrap and strap the next largest section 32 of FIG. 3E to the slightly wider base area of the valve. It should be understood from the figures that the hook-and-loop tape 11a is typically not in contact with the areas of highest temperature which would be adjacent or contacting the valve or pipe. As such, the hook-and-loop tape 11a should be capable of continuous use at temperatures less than 500 degrees Fahrenheit and more akin to 325 degrees Fahrenheit surface temperature.

Figure 4C:
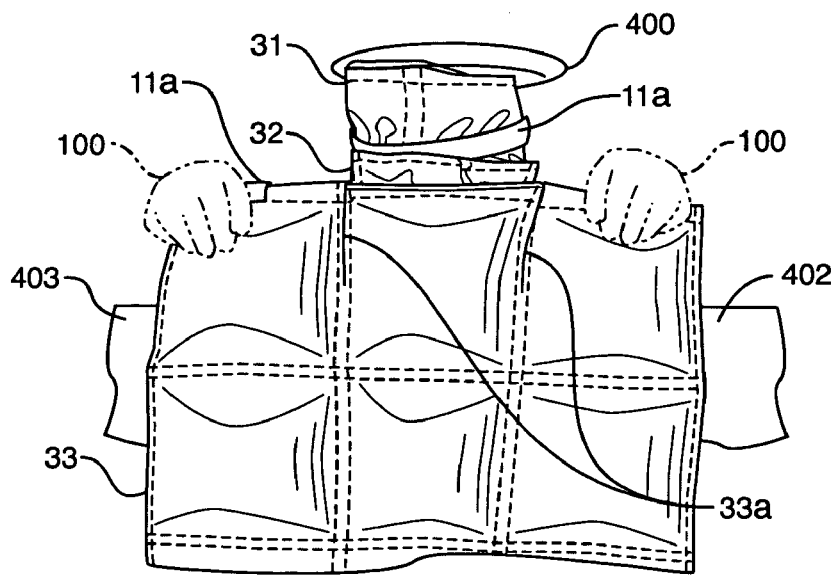
Figure 4D:
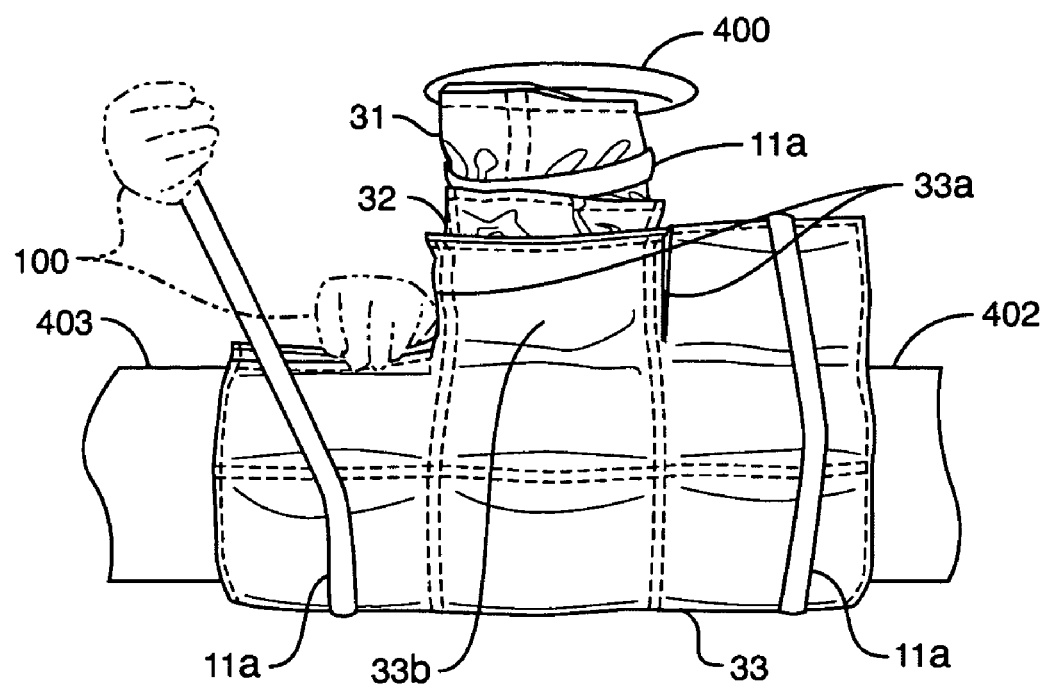
Figure 4E:
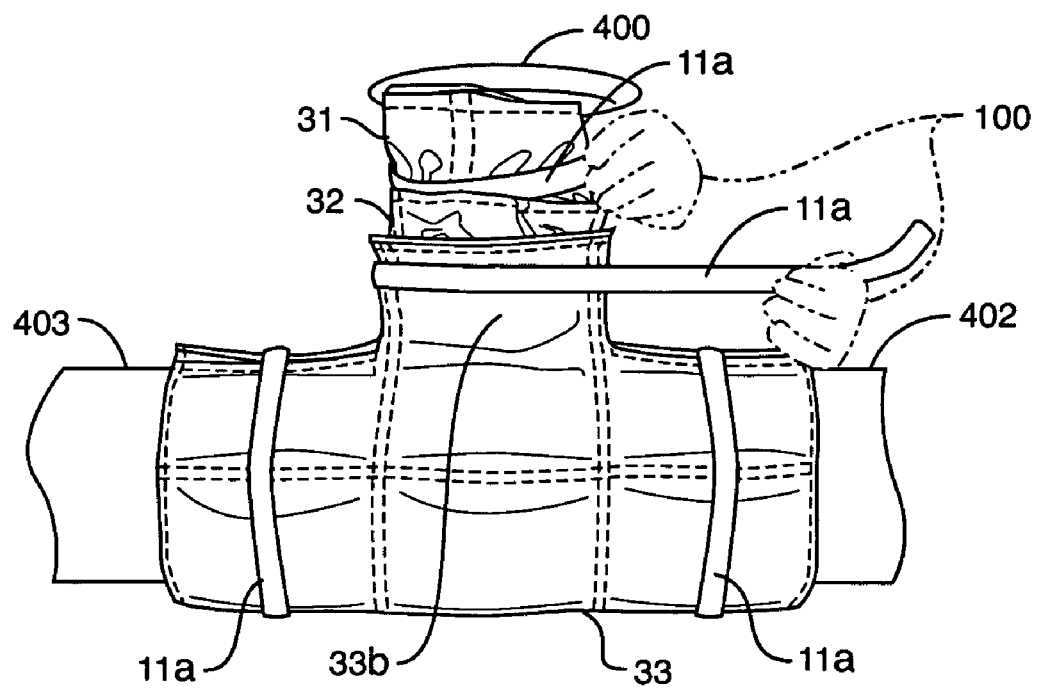

In FIG. 4C, the installer 100 is placing the largest section 33 of FIG. 3E into place around the in-line section 401 of the valve. In such situation, it should be noted that a better fit has been enabled by the installer 100 snipping several inches into edges of the central seams of the largest section as shown as element 33a. This allows the lateral areas 33a of the largest section 33 to be held securely by the hook-and-loop tape 11a against the adjacent pipe insulation 402, 403 as seen in FIG. 4D. Likewise, this also allows the valve base area of the largest section 33 to overlap (at 33a) the previously installed next smaller section 32 and to also be held securely thereupon by the hook-and-loop tape 11a as seen in FIG. 4E.

Accordingly, this completed installation (illustrated by the example seen in FIG. 4E) of the segmented insulative device by an installer using the kit in accordance with present invention results in a cost-effective, removable, and customizable manner of insulating thermal pipes that is applicable to many different configurations and industrial, institutional, and/or commercial applications. Moreover, the installer by way of the present inventive kit has the ability to measure, cut, and install the segmented insulative device on-site without any need to return to a workshop for fabrication such as sewing or molding. In addition to the kit components described above, the kit may further include an installation manual and/or a material quantity estimating software program or manual worksheet.

The above-described embodiments of the present invention are intended to be examples only. Alterations, modifications and variations may be effected to the particular embodiments by those of skill in the art without departing from the scope of the invention, which is defined solely by the claims appended hereto.

What is claimed is:

1. A kit for on-site fabrication of a segmented insulative device, said kit comprising:
    a sheet of segmented insulation capable of separation into multiple sections;
    a reusable fastening tape capable of removably securing one or more of said multiple sections upon a component of a thermal distribution system;
    a cutting mechanism capable of separating said sheet of segmented insulation into said multiple sections and resizing said reusable fastening tape; and
    a fastener capable of affixing said reusable fastening tape to a corresponding one of said multiple sections.

2. The kit as claimed in claim 1, further including an installation manual for instructing a user on assembly of said segmented insulative device formed by said multiple sections and said reusable fastening tape so as to insulate said component of said thermal distribution system.

3. The kit as claimed in claim 2, further including a material quantity estimator for instructing said user on sizing said segmented insulative device prior to said assembly of said segmented insulative device.

4. The kit as claimed in claim 3, wherein said sheet includes a first layer and a second layer each formed from a flexible material, said flexible material being resistant to moisture and heat, and an inner layer of flexible insulation held between said first and second layers by way of stitching, said stitching forming a cut-site for separating by way of said cutting mechanism said segmented insulative device into said multiple sections.

5. The kit as claimed in claim 4, wherein said first layer, said inner layer, and said second layer form a flexible composite through which said layers said stitching is arranged in a grid pattern formed by groupings of closely spaced parallel seams.

6. The kit as claimed in claim 5, wherein said flexible material that forms said first layer and said second layer is a heat resistant fabric coated with a moisture and heat resistant coating.

7. The kit as claimed in claim 6, wherein a portion of said reusable fastening tape is affixed to a corresponding one of each said one or more multiple sections and sized in such a manner so as to allow said portion of said reusable fastening tape to wrap around said corresponding one of each said one or more multiple sections while in place over said component of said thermal distribution system.

8. The kit as claimed in claim 7, wherein said cut-site is located and forms a spacing between said stitching that establishes said closely spaced parallel seams.

9. The kit as claimed in claim 8, wherein said spacing is a predetermined value in a range from 0.5 inches to 1.0 inches.

10. The kit as claimed in claim 9, wherein said groupings of closely spaced parallel seams are separated by a distance in a range between 4.0 inches and 12.0 inches.

11. The kit as claimed in claim 8, wherein said spacing is at least 0.5 inches said groupings of closely spaced parallel seams are separated by a distance in a range between 4.0 inches and 12.0 inches.

12. The kit as claimed in claim 11, wherein said fastener is a stapler and said kit includes staples capable of use within said stapler for affixing said reusable fastening tape to said corresponding one of said multiple sections.

* * * * *